(12) United States Patent
Lavanga et al.

(10) Patent No.: US 7,579,409 B2
(45) Date of Patent: Aug. 25, 2009

(54) POLYETRAFLUOROETHYLENE MICROPOWDER COMPOSITIONS

(75) Inventors: David J. Lavanga, Reading, PA (US); Richard DeLucca, Coatesville, PA (US)

(73) Assignee: AGC Chemicals Americas, Inc., Bayonne, NJ (US)

( * ) Notice: Subject to any disclaimer, the term of this patent is extended or adjusted under 35 U.S.C. 154(b) by 537 days.

(21) Appl. No.: 11/259,139

(22) Filed: Oct. 27, 2005

(65) Prior Publication Data

US 2007/0100077 A1 May 3, 2007

(51) Int. Cl.
 *C08L 27/12* (2006.01)
(52) U.S. Cl. .................. 525/199; 525/209; 524/423; 524/425; 524/430; 524/437; 524/445; 524/463; 524/520; 524/574; 526/250; 526/253; 526/254; 526/348.8
(58) Field of Classification Search .................. 525/199, 525/72, 209; 264/9; 524/463
See application file for complete search history.

(56) References Cited

U.S. PATENT DOCUMENTS

| | | | |
|---|---|---|---|
| 4,507,439 A | 3/1985 | Stewart | |
| 4,520,170 A | 5/1985 | Kitto | |
| 4,879,362 A | 11/1989 | Morgan | |
| 4,882,113 A | 11/1989 | Tu et al. | |
| 4,904,726 A | 2/1990 | Morgan et al. | |
| 5,512,624 A * | 4/1996 | Howard et al. | 524/462 |
| 6,737,165 B1 | 5/2004 | Smith et al. | |
| 6,844,036 B2 | 1/2005 | Apostolo et al. | |
| 6,887,959 B2 | 5/2005 | Schmiegel et al. | |
| 2005/0222337 A1 | 10/2005 | Park | |

FOREIGN PATENT DOCUMENTS

WO 95/02634 1/1995

OTHER PUBLICATIONS

Fuchs et al., "Branching and Cross-Linking in Radiation-Modified Poly(tetrafluoroethylene): A Solid-State NMR Investigation", Macromolecules, 2000, American Chemical Society, vol. 33, pp. 120-124.*
Johnson, Peter S., "Rubber Processing," Carl Hanser Verlag, Munich, 2001, pp. 15-25.
Ebnesajjad, Sina, "Fluoroplastics, Non-Melt Processible Fluoroplastics," PDL Handbook Series, vol. 1, 2000, pp. 191-205.
Product Information Sheet: AFLAS 150/100 Fluoroelastomers, Feb. 2003.
Product Information Sheet: AFLAS SP/SZ Fluoroelastomers, Feb. 2003.
Product Information Sheet: AFLAS MZ Fluoroelastomers, Feb. 2003.
Product Information Sheet: AFLAS® Fluoroealstomers, Sep. 2004.

* cited by examiner

*Primary Examiner*—Marc S. Zimmer
*Assistant Examiner*—Nicole M Buie
(74) *Attorney, Agent, or Firm*—Oblon, Spivak, McClelland, Maier & Neustadt, P.C.

(57) ABSTRACT

A micropowder composition containing a granular PTFE micropowder, a fine powder PTFE micropowder, and a fine powder molding resin provides mixtures with fluoroelastomers containing copolymerized and alternating units of tetrafluoroethylene and propylene that provide molded articles having improved surface smoothness characteristics and tear resistance on molding. Processes for mixing additives with fluoroelastomers by adding or mixing the fluoroelastomer with the additives in the presence of micropowder PTFE compositions.

23 Claims, 8 Drawing Sheets

AFLAS / PTFE STUDY

Surface of vulcanized slabs - 100 X

100S+801 formulation PTFE 100S standard formulation

Surface of vulcanized slabs - 500 X

100S+801 formulation PTFE 100S standard formulation

Surface of vulcanized slabs - 2000 X

100S+801 formulation PTFE 100S standard formulation

POLYETRAFLUOROETHYLENE MICROPOWDER COMPOSITIONS

BACKGROUND OF THE INVENTION

1. Field of the Invention

The invention relates to polytetrafluoroethylene (PTFE) micropowder compositions containing mixtures of PTFE micropowders, and fluoroelastomer compositions that contain the micropowder compositions. The invention further relates to mixing, milling, molding or extrusion processes that include mixing, milling, molding or extruding tetrafluoroethylene/propylene elastomers in the presence of the PTFE micropowder compositions and may include adding one or more additives to a fluoroelastomer composition as a mixture with the PTFE micropowder compositions.

2. Description of the Related Art

Polytetrafluoroethylene (PTFE) micropowders may be used as additives in fluoroelastomer compositions to provide improved abrasion resistance, reduced coefficient of friction, and improved surface characteristics in molded and/or extruded parts. High molecular weight PTFE has been used in elastomeric compositions as a reinforcing additive to improve properties such as tear strength. High molecular weight PTFE may be added to the elastomer or fluoroelastomer during compounding and/or extrusion. It is thought that high molecular weight PTFE fibrillates during mixing and/or extruding to form a network of nodes and fibers that reinforces the elastomer or fluoroelastomer matrix.

An undesired side effect caused by the addition of high molecular weight PTFE to an elastomeric composition may include the formation of surface blemishes during extrusion and/or molding. In addition, unacceptably high hardness and/or modulus may result in cured vulcanizates of PTFE-containing fluoroelastomer or elastomer compositions. Thus, cosmetic defects caused by the PTFE fibril network have limited the use of such compositions to applications where surface appearance is not critical or important.

A reduction in the molecular weight of the PTFE or the use of high molecular weight tetrafluoroethylene (TFE) copolymers comprising tetrafluoroethylene monomer units copolymerized with monomers such as hexafluoropropylene or perfluoro(propylvinylether) may form compositions that can be extruded and/or molded with substantially less surface blemishing (see "Reinforcement with Fluoroplastic Additives", R. A. Morgan, C. W. Stewart, E. W. Thomas and W. M. Stahl, in *Rubber World* May 1991). High molecular weight copolymers of tetrafluoroethylene and hexafluoropropylene are commercially available (e.g., Teflon® MP1500, DuPont) and may be processed smoothly with elastomer or fluoroelastomer polymer matrices. PTFE-based compositions containing high molecular weight TFE copolymers may provide lowered surface blemishing and easier incorporation of fluoropolymer additives into a fluoroelastomer matrix during extrusion or molding. However, lower molecular weight PTFE or fluoroolefin copolymers may exhibit less fibrillation and consequently the resulting compositions may provide reduced tensile strength and less than satisfactory tear properties in comparison to compositions containing higher molecular weight PTFEs.

Lower molecular weight PTFEs may be formed by irradiating high molecular weight PTFEs. Radiation treatment may lead to bond scission and the formation of PTFE having a reduced average molecular weight. Conventionally it has been thought that lower molecular weight PTFEs are not capable of improving the physical properties of fluoroelastomers or other elastomers because lower molecular weight PTFE materials are not capable of providing sufficient fibrillation and hence may not form extensive reinforcing networks. Further, extruding a fluoroelastomer with a lower molecular weight PTFE may cause the PTFE to take the form of continuous long fiber networks, short fibers, elongated platelets, or ribbons formed by the shear stresses exerted upon the elastomeric matrix during processing. This ribbon and/or fibrous form network may not provide the desirable reinforcing properties of fibrillated high molecular weight PTFEs.

Micropowders may be added to elastomeric compositions to enhance the surface and bulk properties of molded parts such as surface lubricity, tear strength and flex life. These micropowders may include PTFE materials which are usually present in amounts no greater than an amount that causes a reduction in the elastic characteristics of the composition.

The flex properties and compressability of elastomer compounds is especially important in applications such as seals that operate under extreme pressure or temperature conditions. Loss of compressability or any tendency towards deformation under harsh conditions such as exposure to materials which may penetrate or otherwise degrade the matrix from which the seal is molded, are often encountered in industries such as the chemical industry and in oil processing.

Fluoroelastomer compositions that contain semi-crystalline fillers may provide improved mechanical properties when the filler is added as a nano-powder. The form of the filler (e.g., PTFE powder) is important in determining whether the resultant composition will provide the desired properties (see "Technoflon Fluoroelastomers and Perfluoroelastomers: The Right Choice for Oil Field Applications," S. Arrigoni, L. Colombo, A. Minutillo, and G. Sanvito, *Oil Field Engineering with Polymers*, London, England November 2003, pp. 249-257). Mixing a perfluoropolymer with a fluoroelastomer to form a coagulate prior to extrusion or molding provides, upon extrusion, a composite matrix containing islands of the perfluoroolefin material encapsulated in a matrix of the fluoroelastomer. Such compositions have mainly used perfluoroolefin micropowders such as PTFE of narrow molecular weight range as a reinforcement and/or filler.

Also important in determining whether or not a particular fluoroelastomer/PTFE composition may provide improved physical characteristics is whether the presence of other fillers such as carbon-based fillers which may be necessary to impart other desirable properties to the resulting elastomeric composition will negatively affect the properties of the composition.

SUMMARY OF THE INVENTION

Accordingly, one object of the invention is to provide PTFE-containing compositions that address the problems noted above. The object of the invention is achieved in one embodiment which includes fluoroelastomer compositions containing one or more fluoroelastomers or one or more fluoroelastomers comprising copolymerized units of alternating tetrafluoroethylene and propylene units, and thereby provide improved molding or extrusion performance when mixed, milled, or extruded in the presence of a PTFE micropowder composition. In a further embodiment the fluoroelastomer compositions may contain a micropowder PTFE composition containing a granular PTFE micropowder having a number average molecular weight of from $10^5$-$10^6$, a fine powder PTFE micropowder having a number average molecular weight of from $10^4$-$10^5$, and a fine powder molding resin having a number average molecular weight of from $10^6$-$10^7$.

Another object of the invention is to provide a method of forming or making compositions which address the problems noted above. The object of the invention is achieved in one embodiment that includes a process that includes at least one of mixing, milling, and extruding a mixture of a fluoroelastomer and the PTFE micropowder composition to provide improved surface smoothness, hot tear strength resistance and mold release characteristics, and may also provide improved surface smoothness and reduced time to incorporate ingredients.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
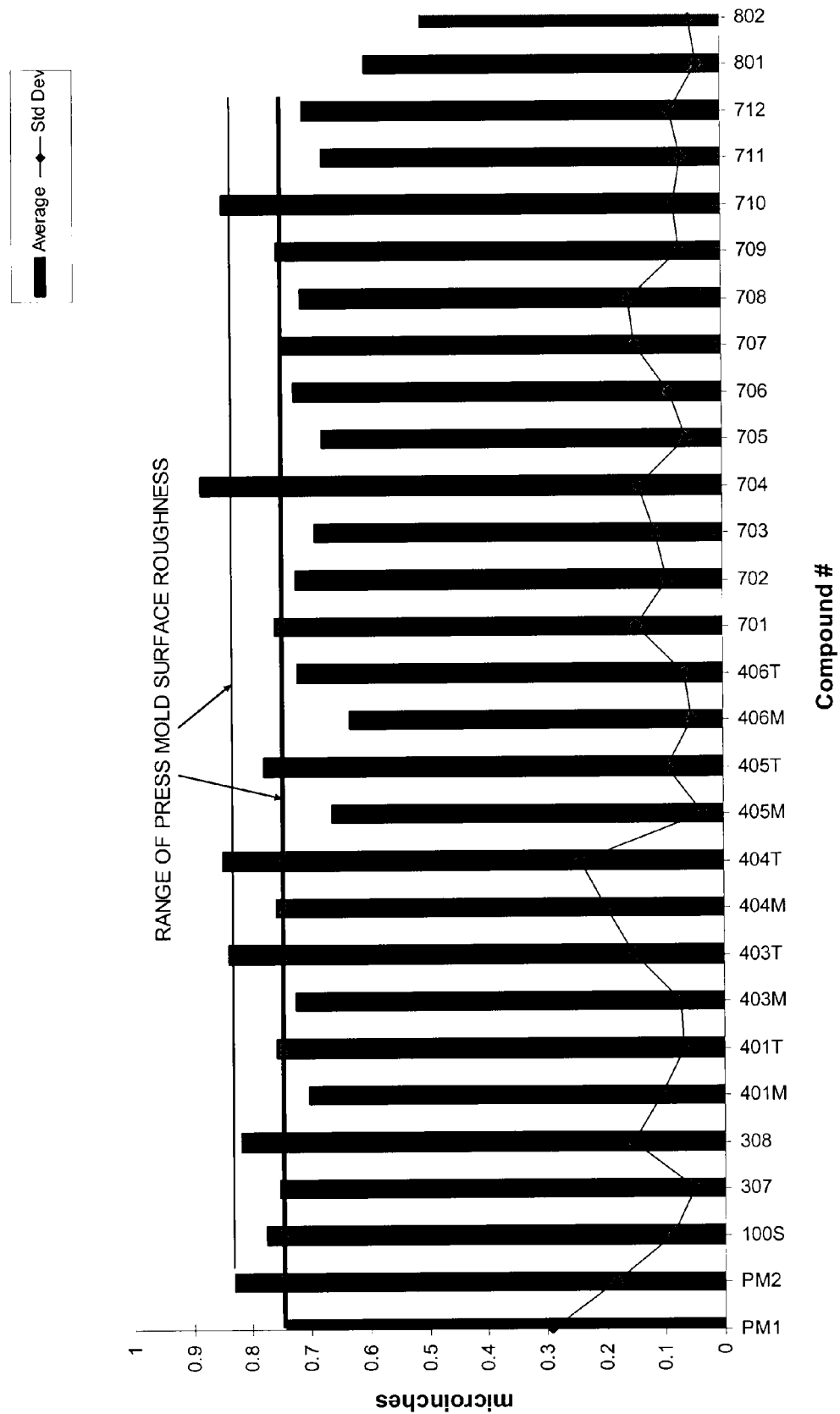
FIG. 1 shows the surface roughness characteristics of a variety of fluorinated plastic compositions containing one or more PTFE-based micropowders.
Figure 2:
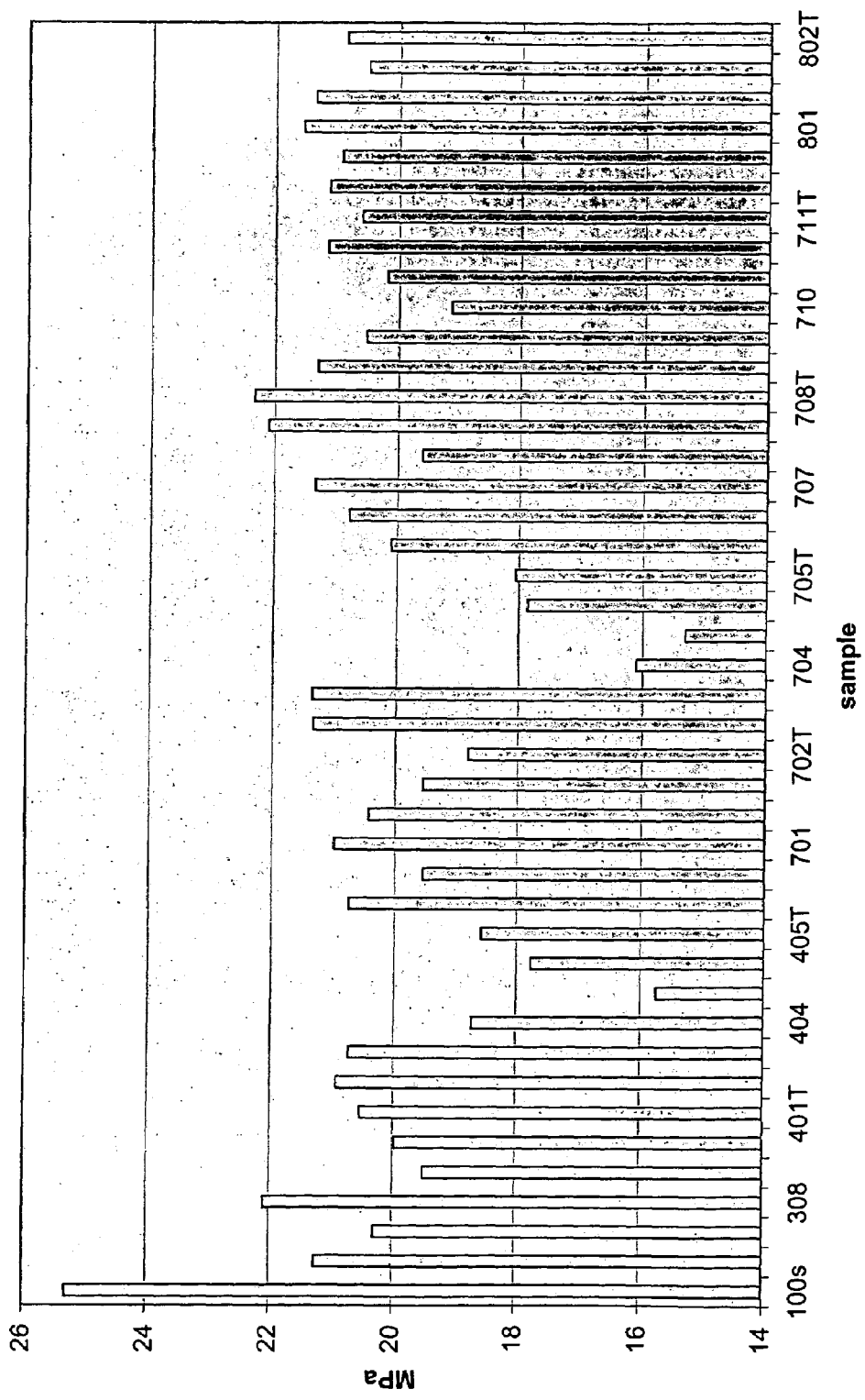
FIG. 2 shows the tensile strength of the samples of FIG. 1.
Figure 3:
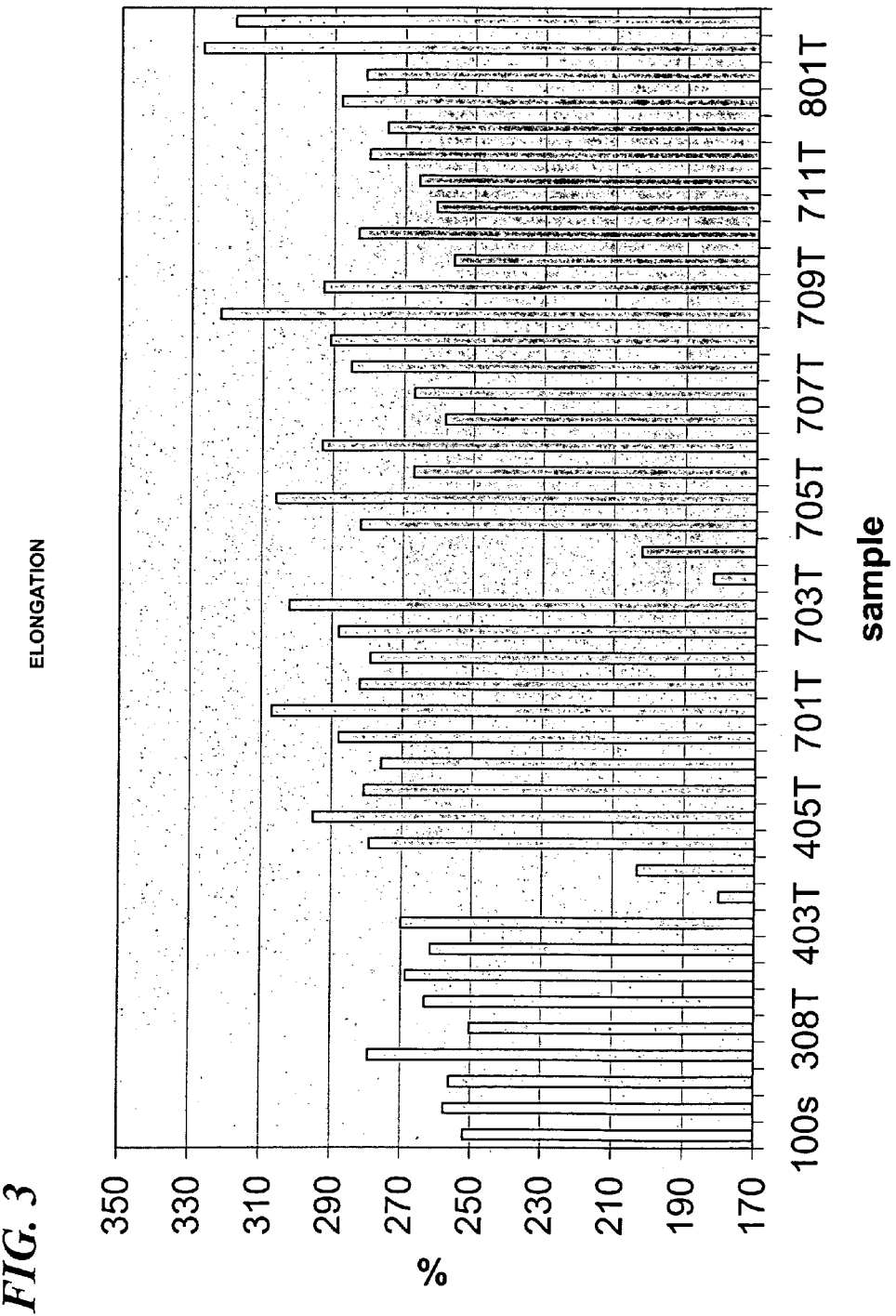
FIG. 3 shows the elongation of the compositions described at FIG. 1.
Figure 4:
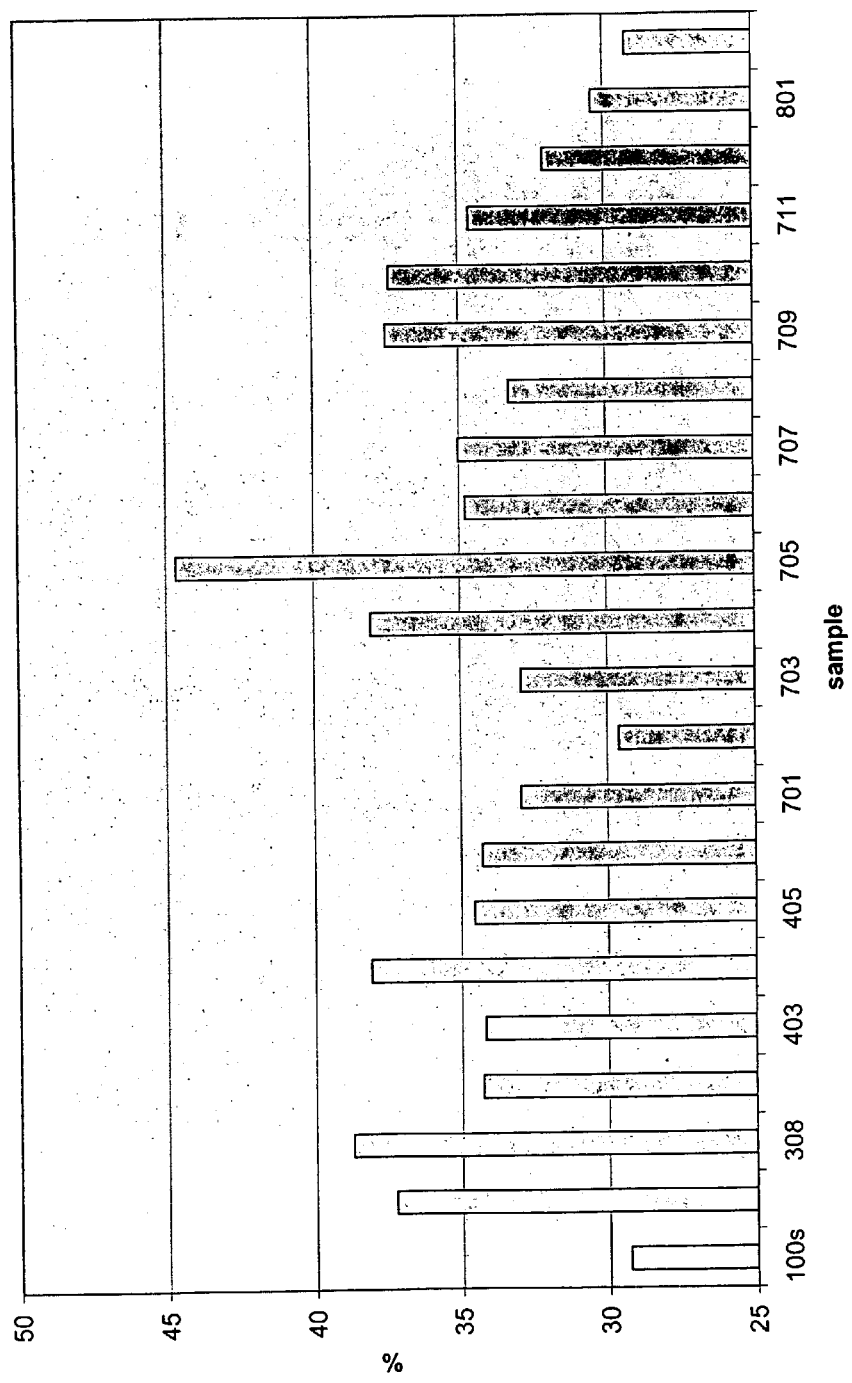
FIG. 4 discloses the compression set of a variety of fluoroelastomer and elastomer compositions of FIG. 1.
Figure 5:
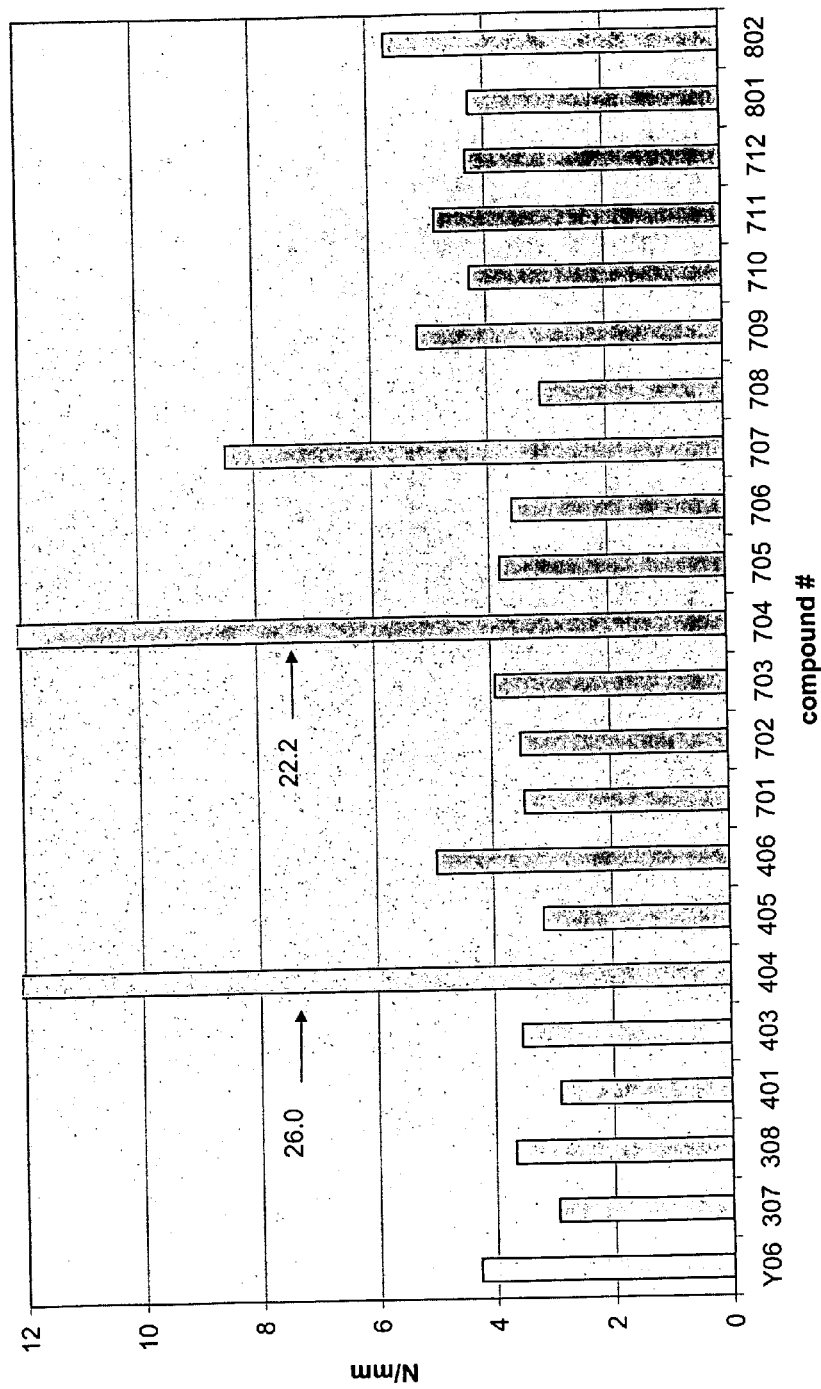
FIG. 5 shows the tear strength of the compositions of FIG. 1.
Figure 6:
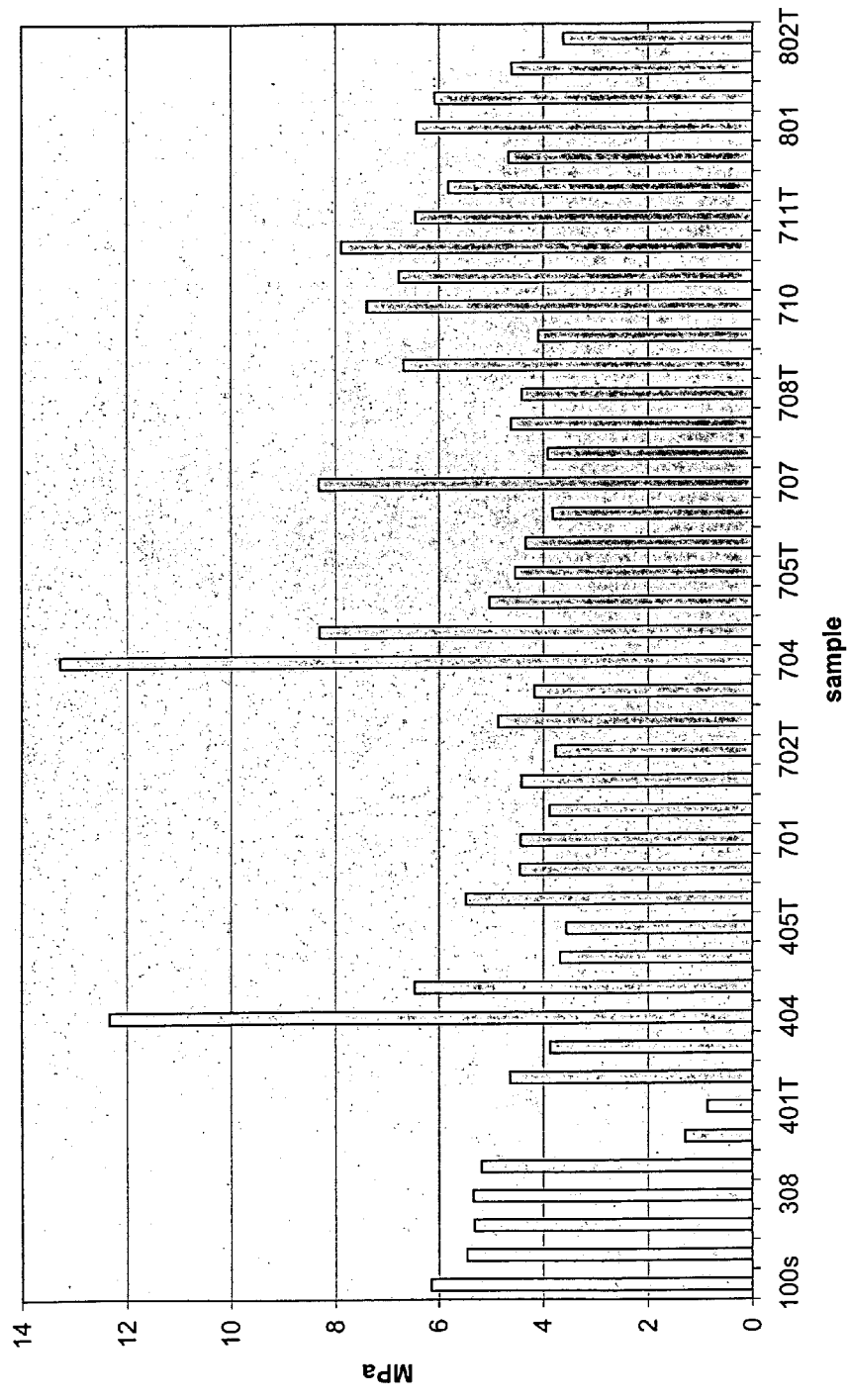
FIG. 6 shows the 100% modulus of the fluoroelastomer/ PTFE compositions of FIG. 1.
Figure 7:
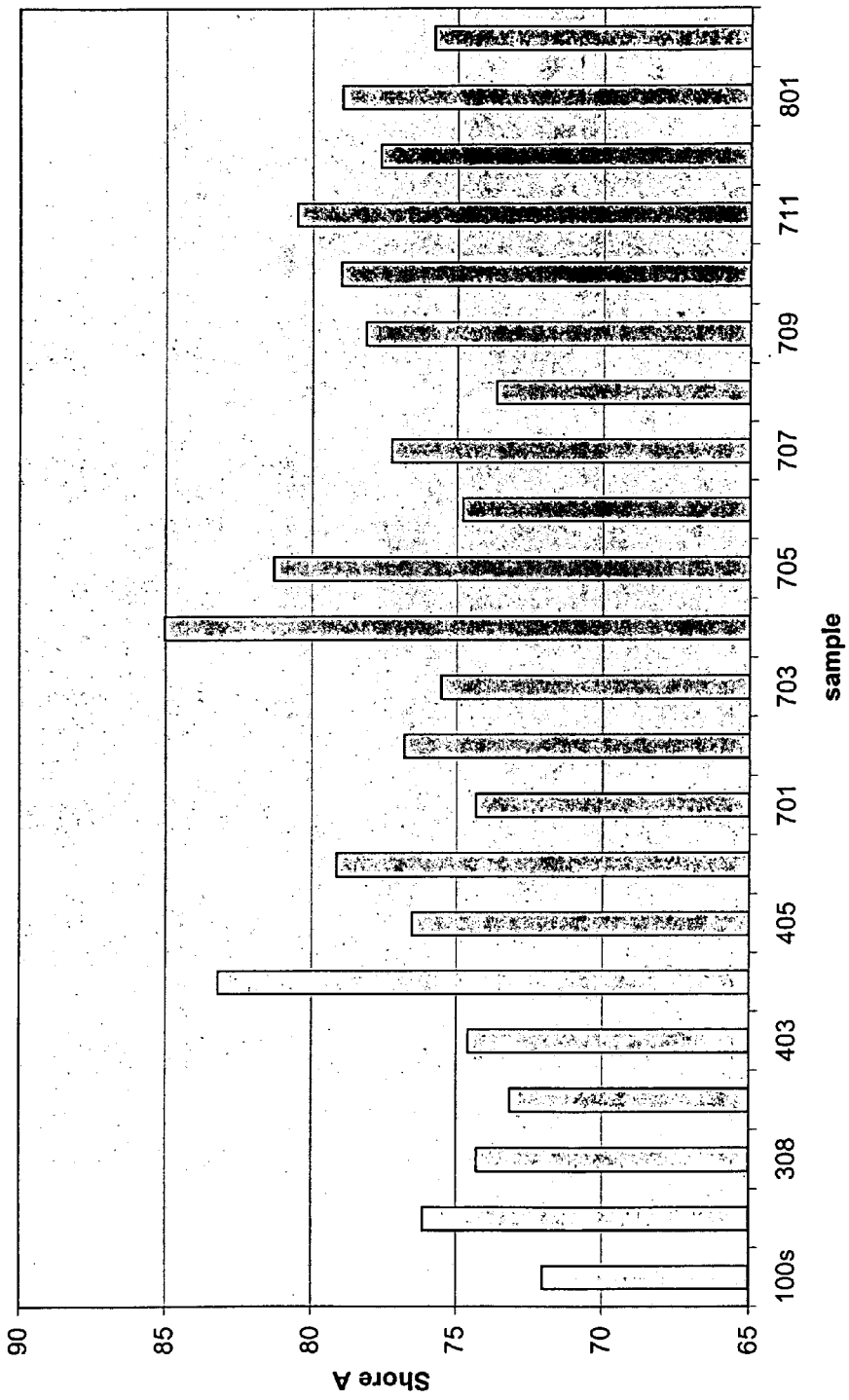
FIG. 7 shows the hardness of the fluoroelastomer to PTFE compositions of FIG. 1.
Figure 8:
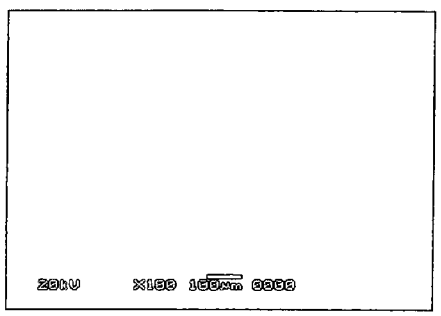
FIG. 8 shows the surface characteristics through SEM micrographs of vulcanized slabs of a polyfluoroolefin and a PTFE micropowder.
Figure 8:
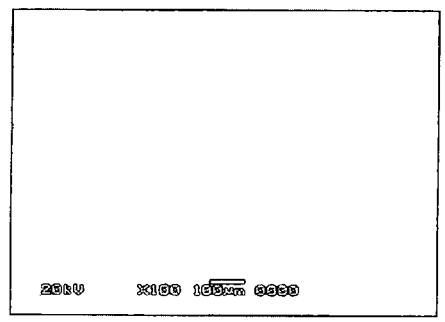
Figure 8:
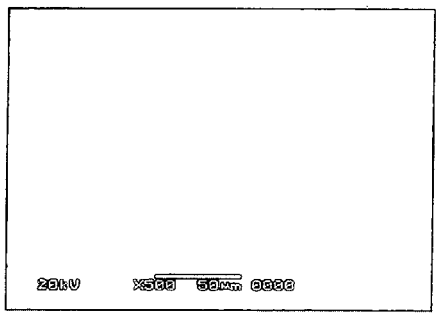
Figure 8:
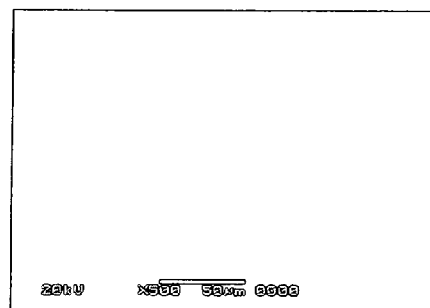
Figure 8:
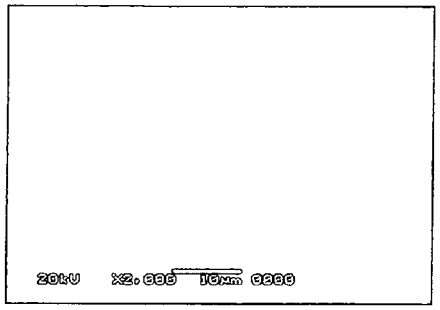
Figure 8:
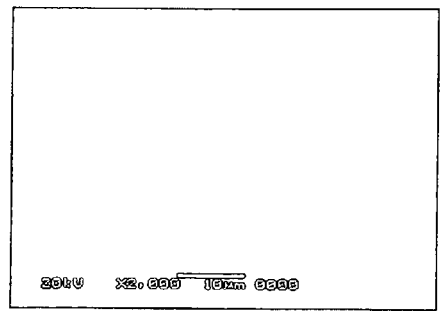

In one embodiment, the invention includes fluoroelastomer compositions containing one or more fluoroelastomers, a PTFE micropowder composition and one or more additional optional components. The fluoroelastomer compositions of the invention include compositions that contain a fluoroelastomer, a granular PTFE micropowder, a fine powder PTFE micropowder, and a fine powder PTFE molding resin.

As used herein the terms "fluoroadditives" and "micropowders" refer to finely divided low molecular weight polytetrafluoroethylene powders. In general, fluoroadditives have small particle size of the order of a few microns, hence the word micropowders. These powders are either granular (suspension polymerized) or fine powder based (dispersion polymerized), which have different particle morphologies, therefore, different properties and incorporation manner in the host material. Their molecular weight is in the range of a few ten thousand to a few hundred thousand compared to several million for the molding (granular and fine powder) resins (see "Fluoroplastics: Volume 1 Non-Melt Processable Fluoroplastics", Chapter 11, page 191—incorporated herein by reference in its entirety).

The fluoroelastomers described herein and present in the compositions of one embodiment of the invention may be perfluorinated or partially fluorinated. A perfluorinated elastomer is one in which all the C—H moieties of the corresponding hydrocarbon elastomer are replaced by C—F moieties. The fluoroelastomers may contain no hydrogen atoms or may contain one or more hydrogen atoms terminally bonded or bonded to the backbone of the fluoroelastomer polymer. The fluoroelastomer may contain alternating units of a perfluorinated or partially fluorinated monomer units bonded to one or more monomer units having no fluorine atoms. Alternately, the fluoroelastomer may contain blocks of polymerized TFE units and blocks of one or more other polymerized fluorinated, partially fluorinated or hydrocarbon monomer units.

Monomers that may be polymerized or co-polymerized to form the fluoroelastomer polymer include the following:

$C_3$-$C_8$ perfluoroolefins, including hexafluoropropene, and hexafluoroisobutene;

$C_{2-8}$ hydrogenated fluoroolefins, such as vinyl fluoride, vinylidene fluoride (VDF), trifluoroethylene, perfluoroalkylethylene, and $CH_2$=CH—$R_f$, wherein $R_f$ is a $C_1$-$C_6$ perfluoroalkyl;

$C_2$-$C_8$ chloro-fluoroolefins, such as chlorotrifluoroethylene;

(per)fluoroalkylvinylethers of formula $CF_2$=$CFOR_f$, wherein $R_f$ is a $C_1$-$C_6$ (per)fluoroalkyl, for example $CF_3$, $C_2F_5$, $C_3F_7$;

(per)fluoro-oxyalkylvinylethers of formula $CF_2$=CFOX, wherein X is a $C_1$-$C_{12}$ alkyl, a $C_1$-$C_{12}$ oxyalkyl, or a $C_1$-$C_{12}$ (per)fluoro-oxyalkyl having one or more ether groups, for example perfluoro-2-propoxy-propyl; fluorodioxoles, and perfluorodioxoles;

fluorovinylethers of formula CFX=$CXOCF_2OR_f$ wherein $R_f$ is a $C_2$-$C_6$ linear, branched or $C_5$-$C_6$ cyclic (per)fluoroalkyl group, or a $C_2$-$C_6$ linear, branched (per)fluorooxyalkyl group containing from one to three oxygen atoms; when $R_f$ is a fluoroalkyl or a fluorooxyalkyl group containing from 1 to 2 atoms, the same or different, selected from the following: H, Cl, Br, I; X=F, H;

the compounds of formula CFX=$CXOCF_2OCF_2CF_2Y$ wherein Y=F, $OCF_3$; $CF_2$=CFOC—$F_2OCF_2CF_3$ and $CF_2$=$CFOCF_2OCF_2CF_2OCF_3$.

Examples of monomer units that are hydrocarbon-based and contain no fluorine atoms and that may be present in the fluoroelastomer in co-polymerized form include ethylene, propylene (including n-propylene and iso-propylene), butylene (including n-butylene and isobutylene), pentene, hexene, heptene and other hydrocarbon-based monomer units containing at least one unsaturated carbon-carbon bond.

Heteroatom-containing monomer units may also be present in co-polymerized form in the fluoroelastomer polymer. Therefore, the co-polymerized monomer unit may contain one or more atoms such as a halogen including chlorine, bromine and iodine; oxygen; nitrogen; and silicone. Examples of oxygen-containing monomer units include fluorovinylethers. Nitrogen-containing monomers may also be present in polymerized form in the fluoroelastomer polymer. The nitrogen-containing monomer unit may be, for example, a nitrile-containing fluorinated vinylether.

Mixtures of any of the above-mentioned perfluorinated, partially fluorinated and/or hydrocarbon-based monomer units may be present in polymerized form in the fluoroelastomer polymer.

In another embodiment, the fluoroelastomer composition may include a curable fluoropolymer. Curable fluoropolymers include peroxide-curable fluoroelastomers and other curable, thermosetting, or vulcanizable fluoropolymers that undergo a chemical reaction to increase or change moleculare weight and/or induce crosslinking. The peroxide-curable fluoroelastomer composition may contain an organic or inorganic peroxide in an amount of about 5 parts per 100 parts of the curable fluoropolymer resin, preferably less than 5 parts per 100 parts of the curable fluoropolymer resin, preferably from 0.5-3 parts per 100 parts of the curable fluoropolymer resin. The peroxide may be a dialkylperoxide having a decomposition temperature such that efficient decomposition of the dialkylperoxide may be accomplished during extrusion or molding of the fluoroelastomer composition. Examples of dialkylperoxides include di-tertiarybutylperoxide, di-amylperoxide, 2,5-dimethyl-2,5-di(tertiarybutylperoxy)-hexyne-3, 2,5-dimethyl-2,5-di(tertiarybutylperoxy)-hexane, dicumylperoxide, dibenzoylperoxide, and tertiarybutylperbenzoate.

Preferred fluoroelastomers include alternating copolymers of tetrafluoroethylene and propylene. Representative fluoroelastomers include AFLAS 100/150 fluoroelastomers commercially available from Asahi Glass Co. The alternating copolymer fluoroelastomers may contain a perfluoroolefin and a hydrocarbon olefin in equal molar amounts, substantially equal molar amounts, or there may be an excess of one monomer type over the other. The alternating copolymers may contain the perfluoroolefin and olefin monomer units in an alternating -TFE-$C_3H_6$-TFE-$C_3H_6$— arrangement, or blocks or partial blocks of polymerized perfluoroolefin and/or hydrocarbon based olefin may be present in the fluoroelastomer.

In another preferred embodiment the fluoroelastomer compositions may contain a fluoroelastomer terpolymer comprising bonded units of a perfluoroolefin, a hydrocarbon-based olefin and a vinylidene fluoride. The vinylidene fluoride may be present in a lower amount than the amount of either the perfluoroolefin or the hydrocarbon-based olefin. The presence of a bonded vinylidene unit in the fluoroelastomer provides a cure site for the fluoroelastomer composition. Representative commercially available fluoroelastomers include AFLAS SZ/SP terpolymers from Asahi Glass Co.

The vinylidene fluoride may be present in more than small quantities and may be present in equal molar quantities relative to the total molar quantities of the perfluoroolefin and/or the hydrocarbon-based olefin. Especially preferred terpolymers comprise bonded units of tetrafluoroethylene, propylene and vinylidene fluoride. Representative terpolymers include AFLAS MZ from Asahi Glass Co.

Fluoroelastomers having a cure site monomer may be cured by bisphenol or may be cured by peroxide. In addition to or in the alternative to the peroxide curing agent, one or more organic or inorganic vulcanization agents may be present in the curable fluoroelastomer compositions. Vulcanization agents may include tertiary sulfonium salts such as $[(C_6H_5)_2S(C_6H_{13})]^+[Cl]^-$, and $[(C_6H_{13})_2S(C_6H_5)]^+[CH_3CO_2]^-$ and quaternary ammonium, phosphonium, arsonium, and stibonium salts of the formula $R_5R_6R_7R_8Y^+X^-$, where Y is phosphorous, nitrogen, arsenic, or antimony; $R_5$, $R_6$, $R_7$ and $R_8$ are individually $C_1$-$C_{20}$ alkyl, aryl, aralkyl, alkenyl, alkoxy and chlorine, fluorine, bromine, cyano, —OR, and —COOR substituted derivatives thereof, with R being $C_1$-$C_{20}$ alkyl, aryl, aralkyl, alkenyl, and where X is halide, hydroxide, sulfate, sulfite, carbonate, pentachlorothiophenolate, tetrafluoroborate, hexafluorosilicate, hexafluorophosphate, dimethyl phosphate, and $C_1$-$C_{20}$ alkyl, aryl, aralkyl, and alkenyl carboxylates and dicarboxylates. Particularly preferred are benzyltri-phenylphosphonium chloride, benzyltriphenylphosphonium bromide, tetrabutylammonium hydrogen sulfate, tetrabutylammonium hydroxide, tetrapropylammonium hydroxide, tetrabutylammonium bromide, tributylallylphosphonium chloride, tributyl-2-methoxypropylphosphonium chloride, 1,8-diazabicyclo[5.4.0]undec-7-ene, and benzyldiphenyl(dimethylamino) phosphonium chloride. Other useful accelerators include methyltrioctylammonium chloride, methyltributylammonium chloride, tetrapropylammonium chloride, benzyltrioctylphosphonium bromide, benzyltrioctylphosphonium chloride, methyltrioctylphosphonium acetate, tetraoctylphosphonium bromide, methyltriphenylarsonium tetrafluoroborate, tetraphenylstibonium bromide, 4-chlorobenzyltriphenylphosphonium chloride, 8-benzyl-l,8-diazabicyclo(5,4,0)-7-undecenonium chloride, diphenylmethyltriphenylphosphonium chloride, allyltriphenylphosphonium chloride, tetrabutylphosphonium bromide, m-trifluoromethyl-benzyltrioctylphosphonium chloride, and other quaternary compounds. The amount of vulcanization agent may be between 0.1 and 20 parts by weight per hundred parts fluoroelastomer. Preferably, 0.5-3.0 parts accelerator per hundred parts fluoroelastomer.

The compositions may contain other additives such as fillers, stabilizers, plasticizers, lubricants and processing aids that may be used in fluoropolymer compositions.

The fluoroelastomer compositions of one embodiment of the invention contain each of (i) a granular PTFE micropowder, (ii) a fine powder PTFE micropowder and (iii) a fine powder PTFE molding resin. The molecular weights of each of the PTFE micropowders, powders and/or resins are preferably different. The PTFE micropowders and resins may be formed by precipitation of PTFE from aqueous polymerization processes. Preferably, the PTFE is one that is fine-milled to form a micropowder, for example a micropowder suitable for use in oils, greases, plastics and other elastomers. A representative micropowder includes FLUON TL-102-2.

FLUON TL-155 may also be used. FLUON TL-155 has a rounded particle shape and may be mixed with other powders in a dry state or during extrusion without further breakdown of the particulate structure.

The PTFE micropowder may be initially present in the form of a coagulated dispersion (CD). In a coagulated dispersion, the PTFE associates to form aggregates of individual particles. Drying the coagulated dispersion may provide a powder having a lower average particle size than the aggregate particles in the coagulated dispersion. Preferably the coagulation is carried out to form an aqueous dispersion of the polytetrafluoroethylene in water.

In one embodiment the fluoroelastomer compositions of the invention contain at least one of a perfluoroelastomer or a partially fluorinated elastomer (e.g., fluoroelastomers) as a major component based on the total amount of the fluoroelastomer, the partially fluorinated elastomer, and the PTFE micropowder composition. Preferably the total amount of fluorinated and/or partially fluorinated elastomers represents at least 75% by weight, more preferably 80% by weight, and even more preferably at least 90% by weight of the total weight of the fluoroelastomers and PTFE micropowder composition.

The granular PTFE micropowder may be present in an amount of from 0.01 to 25 parts per 100 parts of the total amount of the fluoroelastomers and/or elastomers present in the composition. More preferably, the granular PTFE micropowder is present in an amount of from 0.1 to 15 parts per 100 parts of the fluoroelastomers, even more preferably from 1 to 10 parts, especially preferably from 2 to 8 parts and even more preferably about 5 parts per 100 parts of the fluoroelastomers.

The fine powder PTFE micropowder may be present in an amount of from 0.01 to 20 parts per 100 parts of the total amount of fluoroelastomers. More preferably the fine powder PTFE micropowder is present in an amount of from 0.1 to 15 parts, more preferably from 1 to 10 parts and especially preferably about 5 parts per 100 parts of the total amount of fluoroelastomers.

The fine powder PTFE molding resin is present in an amount of from 0.01 to 15 parts per 100 parts of the total amount of fluoroelastomers in the fluoroelastomer composition. More preferably, the fine powder molding resin is present in an amount of 0.1 to 10 parts, more preferably from 0.5 to 5 parts and most preferably about 1 part per 100 parts of the total amount of fluoroelastomers.

The granular PTFE powder may have an average molecular weight of from $10^4$ to $10^7$, preferably from $10^5$ to $10^6$. The granular PTFE micropowder may comprise one or more fluorinated polymers containing at least one bonded tetrafluoroethylene monomer unit. More preferably the PTFE micropowder is one that is a tetrafluoroethylene homopolymer. The granular PTFE micropowder may be prepared by an aqueous dispersion method and is preferably milled to form a granular micropowder.

The granular PTFE micropowder preferably has a particle size of 8 to 45 microns. More preferably the particle size is from 14 to 35 microns.

The fine powder PTFE micropowder may have a number average molecular weight of from $10^3$ to $10^6$, preferably from $10^4$ to $10^5$. The number average molecular weight of the fine powder polytetrafluoroethylene micropowder is different from the molecular weight of the granular PTFE micropowder.

The PTFE of the fine powder PTFE micropowder may be a tetrafluoroethylene homopolymer or may contain one or more copolymers so long as at least one tetrafluoroethylene monomer unit is present in the PTFE polymer.

The fine powder PTFE micropowder may have a particle size of 4 to 30 microns. More preferably the particle size of the fine powder PTFE micropowder is from 10 to 25 microns. The fine powder PTFE micropowder may be obtained by milling or grinding a PTFE polymer having a molecular weight within the molecular weight range of $10^3$ to $10^6$. Most preferably the fine powder PTFE micropowder is a copolymer of tetrafluoroethylene and one or more copolymers having a molecular weight of from $10^4$-$10^6$.

The number average molecular weight of the fine powder PTFE molding resin is from $10^5$ to $10^8$, preferably from $10^6$ to $10^7$. The fine powder PTFE molding resin may be prepared from an aqueous suspension polymerization containing the monomers and/or comonomers present in the fluoropolymer making up the fine powder molding resin.

The fine powder PTFE molding resin may have a median particle size of 525 microns, preferably a median particle size of 300-600, more preferably 475-575 microns.

The measurement method for determining number average molecular weight is carried out according to the procedure described in Lappan, et al., "The Estimation of the Molecular Weight of Polytetrafluoroethylene Based on the Heat of Crystallisation. A Comment on Suwa's Equation," *Macromol. Mater. Eng.* 2004, 289, pp. 420-425 (incorporated herein by reference in its entirety) using the following quantitative relationship $(1.86667 \times 10^{11}) \cdot \Delta H_c \, (cal/gm)^{-5.16}$, where $\Delta Hc$ is the heat of crystallization (see also, "FLUON Polytetrafluoroethylene," Technical Service Note F12, "Physical Properties of Unfilled and Filled Polytetrafluoroethylene," Technical Service Note F13; F12 originally published by AGC Chemicals Americas, Inc., in January 1967; F13 originally printed in April 1969; the publication "Physical Properties of Unfilled and Filled Polytetrafluoroethylene" Technical Service note covers the overall content of the two notes F12 and F13, and includes various revisions and was published 1981) (each of afore-mentioned publications and/or technical service notes is incorporated herein by reference in its entirety).

The granular PTFE micropowder may include one or more micropowders such as FLUON TL-5; TL-10; TL-155; and TL-171. The fine powder PTFE micropowder may include one or more fine powders such as FLUON TL-101; TL-102; and TL-102-2. The fine powder PTFE molding resin may include a resin such as FLUON CD-090; CD-509; and CD-1. In a preferable embodiment, the fine powder molding resin is a coagulated dispersion of a PTFE or a copolymer of TFE and HFP. The fine powder PTFE molding resin may be a polymer that comprises additional co-monomers and/or may be a terpolymer that includes TFE. An example is FLUON CD-509.

One or more of the PTFE micropowder and the fluoroelastomer polymers may comprise alternating copolymerized units of tetrafluoroethylene and at least one selected from the group consisting of hexafluoropropylene and propylene.

Compositions containing mainly the granular PTFE micropowder, the fine powder PTFE micropowder, and the fine powder PTFE molding resin are within the scope of the invention. A master batch containing the granular PTFE, the fine powder PTFE micropowder, and the fine powder molding resin may contain each of the three above-mentioned components in a ratio of (1-50):(1-50):(1-30), preferably (10-50):(10-50):(1-20) and even more preferably (about 5):(about 5):(about 1).

The term "about" as used herein includes the stated value and values substantially the same as the stated value so that any variance from the value stated does not exert a material affect on the composition. For example, the term "about" may encompass a variance of ±10% from the stated value, preferably ±2.5% of the stated value, and even more preferably ±0.5% of the stated value.

In a preferred embodiment of the invention the granular PTFE micropowder, the fine powder PTFE micropowder, and the fine powder PTFE molding resin are present as a mixture in a total amount of at least 90 wt % based on the total weight of the mixture. The mixture is preferably a solid, pulverulent mixture. The mixture may be used as a master batch and may be fed directly into a milling apparatus, an extruder or other melt processing equipment wherein a molten or pulverulent fluoroelastomer or fluoroelastomer-containing composition is present. The PTFE micropowder composition may also be stored, handled and used as a dispersion in an aqueous, inorganic or organic liquid matrix.

The PTFE micropowder composition may be prepared by premixing the granular PTFE micropowder, the fine powder PTFE and the fine powder PTFE micropowder molding resin. Mixing may be carried out by adding the components of the PTFE micropowder composition to a container, in any order, and shaking, agitating or stirring the contents within the container.

The molecular weight of any of the components of the PTFE micropowder composition may be modified by irradiating the component alone or irradiating a mixture of any combination of the components of the PTFE micropowder composition. Irradiation leads to bond scission which may lower the average molecular weight. The radiation dosage may be less than 7.5 mrad to achieve molecular weight modification. See for example S. Ebnesajjad, "Fluoroplastics," Vol. 1, pp. 191-205 (2000), incorporated herein by reference in its entirety.

In other embodiments of the invention the radiation dosage is 7.0 mrad or less. In an especially preferred embodiment of the invention the radiation dosage is preferably 5 mrad or less. The radiation dosage required to modify the molecular weight distribution of the components of the PTFE micropowder composition are less than the radiation dosages required to modify the molecular weight distribution of conventional PTFE compositions.

Irradiated compositions may provide a significant advantage over conventional PTFE compositions because, in one embodiment, the invention PTFE micropowder composition can be molecular weight-modified with radiation in lower radiation dosages than the maximum threshold radiation dosage allowed by the Food and Drug Administration (FDA). Thus one embodiment of the invention PTFE micropowder composition permits its use in medical, food packaging and other applications where FDA compliance may be necessary.

In a further embodiment, the invention includes molded articles obtained by molding a composition containing at least one fluoroelastomer and the invention PTFE micropowder composition (e.g., a micropowder composition comprising each of a granular PTFE, a fine powder PTFE micropowder and a fine powder PTFE molding resin). The fluoroelastomer may be a fluoroelastomer as described above. The fluoroelastomer may be present in a substantially pure form or may comprise other additives and/or polymeric materials.

The molded article of the invention has significantly improved surface characteristics in comparison to a molded article obtained from a fluoroelastomer composition that does not contain each of the granular PTFE micropowder, the fine powder PTFE micropowder, and the fine powder PTFE molding resin. The invention molded article exhibits the improved physical properties associated with fluoroelastomers compounded with high molecular weight PTFE without detrimental surface blemishing. Thus a micropowder composition mixture of three PTFE materials of different molecular weight characteristics may reduce or eliminate problems associated with surface blemishing during molding of conventional fluoroelastomer-containing compositions.

The molded article includes articles that are, e.g., injection molded, extruded, and/or sheet molded. The molded article is preferably molded from the fluoroelastomer-containing composition described above. Molding includes compressing the fluoroelastomer composition under heat and pressure to melt the fluoroelastomer composition so that it may fill a mold. The molded article may also be formed by first melting a fluoroelastomer or fluoroelastomer-containing composition then adding the PTFE micropowder composition described above, and subsequently mixing and kneading the mixture. Upon masticating and kneading, a viscous material is obtained which may be injection molded or compression molded to form a molded article.

The PTFE micropowder may be used as a diluent or carrier for one or more additives. The PTFE micropowder may also be used as a lubricant or compatibilizer to aid in the addition and homogenization of one or more other additives within the fluoroelastomer matrix. Another embodiment the invention includes a process wherein a fluoroelastomer composition containing the PTFE micropowder composition described above is mixed and/or extruded in the presence of one or more additives present in or added to the fluoroelastomer composition as a mixture with the PTFE micropowder composition. Mixing may include mixing the solid fluoroelastomer in pellet or powder form with the PTFE micropowder composition. The resulting solid or powdered mixture may be extruded at a temperature above the glass transition temperature (Tg) or melting temperature of the fluoroelastomer. Thus the PTFE micropowder can be mixed first with one or more additives and then the additive/PTFE micropowder can be added, for example, into an extrusion apparatus. Any processes for mixing rubber compositions with different additives may be used (see for example, "P. S. Johnson, "Rubber Processing," ISBN 1-56990-309-3, (2001), pp. 15-25, incorporated herein by reference).

Preferably the fluoroelastomer and the PTFE micropowder composition are mixed in a Farrell two roll mill or a Banbury internal mixer. The mixing apparatus for mixing the fluoroelastomer with the PTFE micropowder composition preferably exerts high shear on the mixture. Mixing the PTFE micropowder composition and the fluoroelastomer forms a prepolymer compound. The prepolymer compound may then be processed further or may be stored before use. The prepolymer compound may be stable under storage for extended periods as a solid or suspension. The prepolymer may be used in any molding operation to provide a molded article. The prepolymer may subsequently be compression molded to form a loose molded article which may be later subjected to a curing process. The prepolymer may be cured, thermoset and/or cured by heating such as, for example, by injection molding an elastomeric composition comprising a fluoroelastomer polymer and the PTFE micropowder composition.

The PTFE micropowder composition may be incorporated into the fluoroelastomer composition by milling one or more of the granular PTFE micropowder, the fine powder PTFE and the fine powder PTFE micropowder molding resin in the presence of the fluoroelastomer composition. Preferably, the fluoroelastomer composition is milled in the presence of the invention PTFE micropowder composition which contains each of the granular PTFE micropowder, the fine powder PTFE micropowder and the fine powder PTFE molding resin. Preferably, the milling is carried out on the fluoroelastomer composition in solid form. The milling may be carried out in stages including first milling the fluoroelastomer composition with one or more of the granular PTFE micropowder, the fine powder PTFE micropowder and the fine powder PTFE molding resin to form an elastomeric composition containing a milled fluoroelastomer composition. Milling the fluoroelastomeric composition may micronize the PTFE micropowders particles to a smaller size. Milling the elastomers may disperse the ingredients (e.g., additives) in the elastomer composition and may optionally micronize the particles. The term "milling" includes grinding and dispersion. There are many types of mills: some are for grinding, i.e., particle size reduction, and some are for dispersion purposes. Preferably, milling does not change the molecular weight of any of the components of the invention PTFE micropowder composition.

In another embodiment the milling is carried out on the fluoroelastomer composition in the absence of the PTFE micropowder composition. After milling has produced a fluoroelastomer composition having the desired consistency and/or particle size distribution, one or more of the components of the PTFE micropowder composition may be added. Preferably, the milled fluoroelastomer composition is mixed with the PTFE micropowder composition. The PTFE micropowder composition may be mixed with the milled fluoroelastomer composition, alone or in the presence of one or more additives. The mixing may be carried out by, for example, tumbling and/or shearing the milled fluoroelastomer composition and the PTFE micropowder composition in, for example, a Banbury mixer.

The milling of the fluoroelastomer composition is preferably carried out so that the fluoroelastomer does not melt during milling or during mixing with the PTFE micropowder composition. The resulting mixture of milled fluoroelastomer and PTFE micropowder composition may be extruded or used in a molding apparatus such as an injection molder or compression molder to form molded articles.

Mixing includes mechanically mixing and/or hydraulically circulating the fluoroelastomer solid material and the PTFE micropowder composition in an enclosed environment.

Fillers may be present in any of the elastomer and/or fluoroelastomer compositions. Fillers may include materials such as carbon black, clay, montmorillonite, barium sulfate, calcium carbonate, magnesium silicate, alumina and fluoropolymers.

EXAMPLES

Molecular Weight Determination:

Using the AGC method, molecular weight is calculated using the formula $[1.86667 \times 10^{11} \{\Delta Hc(cal/gm)^{-5.16}\}]$ where $\Delta Hc$ is the heat of crystallization measured by differential scanning calorimetry. Typical conditions for a Molecular Weight Determination include using a calibrated DSC (Differential Scanning Calorimeter) with a good baseline; Measure out sample of 10 mg +/−0.25 mg. Heat the polymer (PTFE) up to 350° C. at 10° C./minute. Hold at 350° C. until DSC equilibrates (approx. 1 minute). Cool sample to 250° C. at 10° C./minute. Heating curve temperature capture is 265 to 350° C. range. Cooling curve temperature capture is 260 to 330° C. range. Then using the AGC calculation to determine number average molecular weight. The number average molecular weights for the various PTFE materials used in the following examples are provided in Table 1 below.

4 types of granular based PTFE micropowder were tested, listed in order of decreasing molecular weight: FLUON TL-155, FLUON TL-5, FLUON TL-156 and FLUON TL-10.

Test Procedure

All compounds were mixed on the 2-roll mill.

Slabs and plugs were molded at 177° C. for 20 minutes. No mold release agent was used to assist mold release.

Slabs and plugs were post-cured at 200° C. for 4 hours.

Standard ASTM test methods were used except where noted: ASTM D412 for tensile and elongation, ASTM D395 for compression set, ASTM D624, type T for tear strength at ambient and Shore S1, durometer A, with conveloader for hardness.

M100 is a calculated value based on the correlation between crosshead travel and measured gage length extension.

A Federal Pocket Surf surface roughness gage was used to determine surface effects of molded slabs and/or plugs.

Four iterations of a standard Design of Experiments (DOE) were performed. All compound test results were given an index to grade each test result compared to both the average of all tests and a standard 100S formulation without the PTFE addition. If the particular test result, for example tensile strength, was better than the average of all tensile strength test

TABLE 1

Molecular weights of various PTFE grades

| Description | Product | Hc Temperature (° C.) | Δ Hc (cal/gm) | Calculated Number Average Molecular Weight |
|---|---|---|---|---|
| Granular PTFE Micropowder | FLUON TL-155 | 321.22 | 13.21 | 307,050 |
| Fine Powder PTFE Micropowder | FLUON TL-102-2 | 315.82 | 16.03 | 113,139 |
| Fine Powder Molding Resin | FLUON CD-509 Prime | 316.80 | 8.06 | 3,929,875 |
| Granular PTFE | FLUON G-580 | 317.39 | 8.52 | 2,945,848 |
| Granular PTFE Micropowder | FLUON TL-900 | 320.06 | 14.43 | 194,649 |
| Fine Powder PTFE Micropowder | FLUON TL-101 | 320.54 | 14.14 | 216,147 |
| Granular PTFE Micropowder | FLUON TL-10 | 314.34 | 16.71 | 91,308 |
| Granular PTFE Micropowder | FLUON TL-5 | 318.58 | 16.32 | 103,141 |

The tear strength, processability and mold release ability of the fluoroelastomer AFLAS 100S by the addition of PTFE, with no mold fouling and little affect on physical properties was determined and the affect of directional reinforcement on physical properties was assessed.

Test Ingredients

All compounds were made with AFLAS 100S with 25 phr MT Carbon.

2 types of high molecular weight Polytetrafluoroethylene (PTFE) were tested: One granular, FLUON G580, and one coagulated dispersion (CD), FLUON CD 509.

3 types of CD based PTFE micropowders were tested, listed in order of decreasing molecular weight: FLUON TL-101, FLUON TL-900, and FLUON TL-102-2.

results, it is weighted as +0.5. If the particular test result was better than the 100S standard formulation, it was weighted as +1.0. If it is better than both, it was weighted as +2.0. All other test results are weighted as −0.5. Therefore, the higher the index, the better the test result. Slabs were molded machine direction and transverse direction to test for reinforcement.

The first iteration established a baseline. Two irradiated granular based PTFE micropowders (TL-10 & TL-5), two irradiated CD based PTFE micropowders (TL-101 & TL-102-2) and one non-irradiated high molecular weight PTFE powder fine powder molding resin (CD509) were compounded at 10 phr. In addition, one of each type irradiated PTFE micropowder (TL-5 & TL-102-2) was compounded at 20 phr. TL-5 and TL-102-2 processed very easily and were readily absorbed by the AFLAS, even at 20 phr. TL-101 and TL-10 did not process quite as easily but were still considered adequate. All micropowders released from the mold easily and left no residue. CD509 was very difficult to process at 10 phr and at 20 phr was impossible. At 10 phr it stuck to the press mold and left a dark residue that did not clean off easily. The CD based PTFE micropowders showed no reinforcing ability, the granular based PTFE micropowders were mildly reinforcing but the high molecular weight PTFE (CD509) showed strong directional reinforcement and powerful resistance to tear. However, CD509 also showed a depressed RPA cure curve. FIGS. 1-7 provide surface roughness, tensile strength, tensile elongation, compression set, tear strength, 100% modulus, and hardness comparisons for the resulting molded samples. Table 2 provides individual test results and index numbers. The legend of formulations is provided in Table 14.

(G580) and different concentrations thereof (phr). One compound was mixed with Boron Nitride as a test of Cerflon® technology. At 10 phr, all the irradiated PTFE micropowders processed very well, did not stick to mold and left no residue. 20 phr of TL-101 and 40 phr of TL-102-2, although they processed well, they both stuck mildly to the mold and left a slight whitish residue, which easily wiped off. G580 was difficult to process (smoking was observed on the 2-roll mill), stuck to the mold and left a dark residue that did not clean off easily. All the irradiated PTFE micropowders showed mild to no reinforcing ability but the high molecular weight PTFE showed strong directional reinforcement and resistance to tear. In fact, 3 phr of CD509 was much more strongly reinforcing than 40 phr of TL-102-2. Table 3 provides test results.

TABLE 2

1st Iteration

| Compound - Testing Direction | B100307 Machine | B1004307 Transverse | B1004308 Machine | B1004308 Transverse | B1004401 Machine | B1004401 Transverse | B1004403 Machine | B1004403 Transverse |
|---|---|---|---|---|---|---|---|---|
| 100S | 100 | | 100 | | 100 | | 100 | |
| MT - Carbon | 25 | | 25 | | 25 | | 25 | |
| TL-101 | 10 | | | | | | | |
| TL-10 | | | 10 | | | | | |
| TL-102-2 | | | | | 10 | | | |
| TL-5 | | | | | | | 10 | |
| CD 509 | | | | | | | | |
| TAIC | 5 | | 5 | | 5 | | 5 | |
| Perkadox 14 | 1 | | 1 | | 1 | | 1 | |
| Na-stearate | 1 | | 1 | | 1 | | 1 | |
| Tensile (MPa) | 21.3 | 20.3 | 22.1 | 19.5 | 20.0 | 20.5 | 20.9 | 20.7 |
| M100 (MPa) | 5.5 | 5.3 | 5.3 | 5.2 | | | 4.6 | 3.9 |
| Elong. (%) | 257.6 | 256.0 | 279.2 | 250.4 | 263.2 | 268.8 | 261.6 | 270.0 |
| Hardness | 76.2 | | 74.3 | | 73.1 | | 74.6 | |
| CompSet (%) | 37.2 | | 38.7 | | 34.3 | | 34.2 | |
| Tear (N/mm) | 3.0 | | 3.7 | | 2.9 | | 3.5 | |
| Roughness (um) | 0.75 | | 0.82 | | 0.70 | | 0.73 | |
| Index | | 1.50 | | −0.50 | | 4.50 | | 3.50 |

| Compound - Testing Direction | B1004404 Machine | B1004404 Transverse | B1004405 Machine | B1004405 Transverse | B1004406 Machine | B1004406 Transverse | B1003Y06 | B1004616 |
|---|---|---|---|---|---|---|---|---|
| 100S | 100 | | 100 | | 100 | | 100 | 100 |
| MT - Carbon | 25 | | 25 | | 25 | | 25 | 30 |
| TL-101 | | | | | | | | |
| TL-10 | | | | | | | | |
| TL-102-2 | | | 20 | | | | | |
| TL-5 | | | | | 20 | | | |
| CD 509 | 10 | | | | | | | |
| TAIC | 5 | | 5 | | 5 | | 5 | 5 |
| Perkadox 14 | 1 | | 1 | | 1 | | 1 | 1 |
| Na-stearate | 1 | | 1 | | 1 | | 1 | 2 |
| Tensile (MPa) | 18.7 | 15.7 | 17.8 | 18.6 | 20.7 | 19.5 | 25.3 | 21.6 |
| M100 (MPa) | 12.3 | 6.5 | 3.7 | 3.6 | 5.5 | 4.4 | 6.2 | 4.6 |
| Elong. (%) | 180.0 | 203.2 | 279.2 | 295.2 | 280.8 | 276.0 | 252.0 | 257.0 |
| Hardness | 83.2 | | 76.5 | | 79.1 | | 72.0 | 73.0 |
| CompSet (%) | 38.1 | | 34.5 | | 34.3 | | 29.3 | |
| Tear (N/mm) | 26.0 | | 3.2 | | 5.0 | | 4.3 | |
| Roughness (um) | 0.76 | | 0.66 | | 0.63 | | 0.78 | |
| Index | | 4.00 | | 4.50 | | 6.00 | | |

The second iteration included data with additional types of irradiated PTFE micropowders (TL-155, TL-156 & TL-900), another high molecular weight granular PTFE powder

TABLE 3

2nd Iteration

| Compound - | B1004701 Machine | B1004701 Transverse | B1004702 Machine | B1004702 Transverse | B1004703 Machine | B1004703 Transverse | B1004704 Machine | B1004704 Transverse |
|---|---|---|---|---|---|---|---|---|
| 100S | 100 | | 100 | | 100 | | 100 | |
| MT - Carbon | 25 | | 25 | | 25 | | 25 | |
| TL-101 | | | 20 | | | | | |
| TL-156 | 10 | | | | | | | |
| TL-102-2 | | | | | | | | |
| TL-155 | | | | | 10 | | | |
| CD 509 | | | | | | | | |
| G 580 | | | | | | | 10 | |
| Boron Nitride | | | | | | | | |
| TL-900 | | | | | | | | |
| TAIC | 5 | | 5 | | 5 | | 5 | |
| Perkadox 14 | 1 | | 1 | | 1 | | 1 | |
| Na-stearate | 1 | | 1 | | 1 | | 1 | |
| Tensile (MPa) | 21.0 | 20.4 | 19.6 | 18.8 | 21.3 | 21.4 | 16.1 | 15.3 |
| M100 (MPa) | 4.4 | 3.9 | 4.4 | 3.8 | 4.9 | 4.2 | 13.3 | 8.3 |
| Elong. (%) | 288.0 | 307.0 | 282.0 | 279.0 | 288.0 | 302.0 | 182.0 | 202.0 |
| Hardness | 74.3 | | 76.8 | | 75.5 | | 85.0 | |
| CompSet (%) | 32.9 | | 29.6 | | 32.9 | | 38.0 | |
| Tear (N/mm) | 3.5 | | 3.5 | | 3.9 | | 22.2 | |
| Roughness (um) | 0.76 | | 0.72 | | 0.69 | | 0.88 | |
| Index | | 5.50 | | 4.50 | | 6.50 | | 2.50 |

| Compound - | B1004705 Machine | B1004705 Transverse | B1004706 Machine | B1004706 Transverse | B1004707 Machine | B1004707 Transverse | B1004708 Machine | B1004708 Transverse |
|---|---|---|---|---|---|---|---|---|
| 100S | 100 | | 100 | | 100 | | 100 | |
| MT - Carbon | 25 | | 25 | | 25 | | 25 | |
| TL-101 | | | | | | | | |
| TL-156 | | | | | | | | |
| TL-102-2 | 40 | | | | | | 5 | |
| TL-155 | | | | | | | | |
| CD 509 | | | | | 3 | | | |
| G 580 | | | | | | | | |
| Boron Nitride | | | | | | | 5 | |
| TL-900 | | | 10 | | | | | |
| TAIC | 5 | | 5 | | 5 | | 5 | |
| Perkadox 14 | 1 | | 1 | | 1 | | 1 | |
| Na-stearate | 1 | | 1 | | 1 | | 1 | |
| Tensile (MPa) | 17.9 | 18.1 | 20.1 | 20.8 | 21.3 | 19.6 | 22.1 | 22.3 |
| M100 (MPa) | 5.0 | 4.5 | 4.3 | 3.8 | 8.3 | 3.9 | 4.6 | 4.4 |
| Elong. (%) | 282.0 | 306.0 | 267.0 | 293.0 | 258.0 | 267.0 | 285.0 | 291.0 |
| Hardness | 81.3 | | 74.8 | | 77.3 | | 73.6 | |
| CompSet (%) | 44.7 | | 34.8 | | 35.0 | | 33.3 | |
| Tear (N/mm) | 3.8 | | 3.6 | | 8.5 | | 3.1 | |
| Roughness (um) | 0.68 | | 0.73 | | 0.74 | | 0.71 | |
| Index | | 2.50 | | 2.50 | | 6.50 | | 6.50 |

The third iteration was based on the best results from the previous two iterations by combining ingredients. CD509 was strongly reinforcing, had the best tear resistance and highest modulus but had unacceptably high hardness and compression set. TL-155 had the highest overall index but with slightly higher hardness and compression set. 1 phr CD509 blended with 10 phr of either irradiated PTFE micropowder by itself or mixed with Boron Nitride compounded easily, released from the mold easily and left no residue yet maintained a higher tear strength and modulus than standard 100S. Table 4 provides test results.

TABLE 4

3rd Iteration

| Compound | B1004709 Machine | B1004709 Transverse | B1004710 Machine | B1004710 Transverse | B1004711 Machine | B1004711 Transverse | B1004712 Machine | B1004712 Transverse |
|---|---|---|---|---|---|---|---|---|
| 100S | 100 | | 100 | | 100 | | 100 | |
| MT - Carbon | 25 | | 25 | | 25 | | 25 | |
| TL-101 | | | | | | | | |
| TL-5 | | | | | | | | |
| TL-102-2 | | | | | 5 | | | |
| TL-155 | 10 | | | | | | 5 | |
| CD 509 | 1 | | | | 1 | | 1 | |
| G 580 | | | | | | | | |
| Boron Nitride | | | 10 | | 5 | | 1 | |
| TL-900 | | | | | | | | |
| TAIC | 5 | | 5 | | 5 | | 5 | |
| Perkadox 14 | 1 | | 1 | | 1 | | 1 | |
| Na-stearate | 1 | | 1 | | 1 | | 1 | |
| Tensile (MPa) | 21.3 | 20.5 | 19.1 | 20.2 | 21.2 | 20.6 | 21.1 | 20.9 |
| M100 (MPa) | 6.7 | 4.1 | 7.4 | 6.8 | 7.9 | 6.5 | 5.8 | 4.7 |
| Elong. (%) | 322.0 | 293.0 | 256.0 | 283.0 | 261.0 | 266.0 | 280.0 | 275.0 |
| Hardness | 78.2 | | 79.0 | | 80.5 | | 77.7 | |
| CompSet (%) | 37.5 | | 37.4 | | 34.6 | | 32.0 | |
| Tear (N/mm) | 5.2 | | 4.3 | | 4.9 | | 4.3 | |
| Roughness (um) | 0.75 | | 0.85 | | 0.68 | | 0.71 | |
| Index | | 7.50 | | 4.00 | | 9.00 | | 8.00 |

Boron nitride was added and tested as a dispersion aid to determine the effect on the standard formulation. Boron nitride by itself is difficult to process for the opposite reason than high molecular weight PTFE and is a good release agent that prevents AFLAS from sticking to the roller during compounding. This property of Boron nitride actually may increase processing time. A more elevated RPA cure curve was noted. These difficulties were not present when the Boron nitride was mixed with irradiated PTFE micropowders.

The fourth iteration used the best qualities of all previous tests. 1 phr high molecular weight PTFE powder (CD-509), 5 phr granular based irradiated PTFE micropowder (TL-155), and 5 phr very low molecular weight CD based irradiated PTFE micropowder (TL-102-2) was added to standard formulation gave excellent results. It compounded very well, lifted right out of the mold and left no residue. Hardness was slightly elevated but was compensated for in the next compound by dropping out 10 phr of MT-Carbon. This not only decreased hardness, it also decreased compression set while actually increasing tear strength. This group had the smoothest surface finish of any group tested and the RPA cure curves closely matched 100S standard formulation, especially formulation "801". Table 5 provides test results.

TABLE 5

4th Iteration

| Compound - | B1004801 Machine | B1004801 Transverse | B1004802 Machine | B1004802 Transverse | B1003Y06 | B1004616 | Japan | Japan |
|---|---|---|---|---|---|---|---|---|
| 100S | 100 | | 100 | | 100 | 100 | 100 | 100 |
| MT - Carbon | 25 | | 15 | | 25 | 30 | 25 | 30 |
| TL-101 | | | | | | | | |
| TL-5 | | | | | | | | |
| TL-102-2 | 5 | | 5 | | | | | |
| TL-155 | 5 | | 5 | | | | | |
| CD 509 | 1 | | 1 | | | | | |
| G 580 | | | | | | | | |
| Boron Nitride | | | | | | | | |
| TL-900 | | | | | | | | |
| TAIC | 5 | | 5 | | 5 | 5 | 5 | 5 |
| Perkadox 14 | 1 | | 1 | | 1 | 1 | 1 | 1 |
| Na-stearate | 1 | | 1 | | 1 | 2 | 1 | 1 |
| Tensile (MPa) | 21.6 | 21.4 | 20.5 | 20.9 | 25.3 | 21.6 | 20.9 | 21.2 |
| M100 (MPa) | 6.4 | 6.1 | 4.6 | 3.6 | 6.2 | 4.6 | 5.2 | 7.4 |
| Elong. (%) | 288.0 | 281.0 | 327.0 | 318.0 | 252.0 | 257.0 | 248.0 | 243.0 |
| Hardness | 79.0 | | 75.8 | | 72.0 | 73.0 | 71.0 | 72.0 |
| CompSet (%) | 30.4 | | 29.3 | | 29.3 | | 26.0 | 24.0 |
| Tear (N/mm) | 4.3 | | 5.7 | | 4.3 | | | |
| Roughness(um) | 0.60 | | 0.51 | | 0.78 | | | |
| Index | | 10.50 | | 9.50 | | | | |

The 5:5:1 ratio of the 801-formulation (5 phr TL-155, 5 phr TL-102-2 & 1 phr CD509) takes advantage of the good qualities of each PTFE ingredient. The TL-155 is a good general PTFE micropowder that processes easily and increases the mold release capability of AFLAS without adversely affecting tensile properties. The TL-102-2 is a processing aid that is readily absorbed by AFLAS and acts as a smoothing agent, offsetting the strong directional reinforcement of the other additives. The CD509 increases the tear strength and Modulus, which seem to be related to each other (see FIGS. 4 and 5). Reducing the amount of MT Carbon, as in the 802-formulation, lowered the hardness and compression set. Tensile properties show good comparison to 100S standard formulation. Tensile Strength may decrease, but Elongation increases. Hardness and Tear Strength increased. All other physical properties are comparable (see FIGS. 1-8). Table 6 shows corroboration of test results by an independent laboratory.

TABLE 6

| | Compound - | | |
|---|---|---|---|
| | 801-A | 801-B | Standard 100S |
| Tensile (MPa) | 18.5 | 18.8 | 20.0 |
| M100 (MPa) | 7.2 | 7.3 | 6.8 |
| Elong. (%) | 237.0 | 230.0 | 227.0 |
| Hardness | 75.0 | 75.0 | 73.0 |
| CompSet (%) | 28.2 | 27.6 | 30.3 |
| Specific Gravity | 1.62 | 1.62 | 1.59 |

The 5:5:1 ratio of the 801 formulations provides a good starting point for an improved compound and can be easily adjusted. Advantageously from a processing standpoint the 801-formulation family is easily absorbed into the AFLAS on the two-roll mill with minimal fall through of ingredients, good mold releaseability and resistance to mold fouling, as shown in Tables 7, 8 and 9.

TABLE 7

PTFE micropowder grades showing improved process ability

| PHR | CD509 | CDG580 | CDTL-101 | GRTL-155 | CDTL-900 | GRTL-5 | GRTL-156 | CDTL-102-2 | GRTL-10 | B Nitride |
|---|---|---|---|---|---|---|---|---|---|---|
| 1 | Y | | | | | | | | | Y |
| 3 | N | | | | | | | | | |
| 5 | | | | Y2 | | Y2 | | Y2 | | N |
| 10 | N | N | Y3 | Y2 | Y2 | Y2 | Y2 | Y2 | Y3 | N |
| 20 | N | | N | | | Y2 | | Y2 | | |
| 40 | | | | | | | | Y2 | | |

Y = improved processability with TL;
Y2 = good;
Y3 = marginal;
N = no improved processability.

TABLE 8

PTFE micropowder grades showing resistance to mold sticking

| PHR | CD509 | CDG580 | CDTL-101 | GRTL-155 | CDTL-900 | GRTL-5 | GRTL-156 | CDTL-102-2 | GRTL-10 | B Nitride |
|---|---|---|---|---|---|---|---|---|---|---|
| 1 | with TL | | | | | | | | | A1 |
| 3 | A | | | | | | | | | |
| 5 | | | | A | | A | | A | | A1 |
| 10 | B | B | A | A | A | A | A | A | A | A |
| 20 | B | | B | | | A | | A | | |
| 40 | | | | | | | | B | | |

A = Good;
A1 = Good with TL;
B = Bad

TABLE 9

PTFE micropowder grades showing resistance to mold fouling

| PHR | CD509 | G580 | CDTL-101 | GRTL-155 | CDTL-900 | GRTL-5 | GRTL-156 | CDTL-102-2 | GRTL-10 | B Nitride |
|---|---|---|---|---|---|---|---|---|---|---|
| 1 | A1 | | | | | | | | | A1 |
| 3 | N | | | | | | | | | |
| 5 | | | | A | | A | | A | | A1 |
| 10 | N | N | A | A | A | A | A | A | A | N |
| 20 | N | | | N | | | A | | A | |
| 40 | | | | | | | | N | | |

A1 = Yes with TL;
A = yes;
N = no improved mold fouling observed

Another aspect of the formulation is the significant smoothness of the cured compound. This is clearly shown in FIG. 1 and the SEM micrographs in FIG. 8. Lastly, while the 801 formulation showed a marginal increase in tear strength at ambient, the 802 formulations showed marked improvement. However, testing showed a 30% increase in hot tear strength at 180° C. with the 801 formulations over standard 100S (Table 10).

TABLE 10

Hot tear strength test results by independent lab

| | Compound - | | |
|---|---|---|---|
| | 801-A | 801-B | Standard 100S |
| Tear (N/mm) | 6.8 | 6.9 | 5.2 |

The surface roughness characteristics of a family of fluoroelastomer compositions containing the PTFE micropowder composition are shown in FIG. 1. The surface roughness is obtained by press molding the compositions and the surface roughness is measured as described above. The compositions are identified at the bottom horizontal axis of the chart in FIG. 1. The compositions are keyed to the compositions described in Table 11.

TABLE 11

100S = 100S standard formulation
307 = 100S with 10 phr TL-101 added
308 = 100S with 10 phr TL-10 added
401 = 100S with 10 phr TL-102-2 added
403 = 100S with 10 phr TL-5 added
404 = 100S with 10 phr CD 509 added
405 = 100S with 20 phr TL-102-2 added
406 = 100S with 20 phr TL-5 added
701 = 100S with 10 phr TL-156 added
702 = 100S with 20 phr TL-101 added
703 = 100S with 10 phr TL-155 added
704 = 100S with 10 phr G 580 added
705 = 100S with 40 phr TL-102-2 added
706 = 100S with 10 phr TL-900 added
707 = 100S with 3 phr CD 509 added
708 = 100S with 5 phr TL-102-2, 5 phr B Nitride added
709 = 100S with 10 phr TL-155, 1 phr CD 509 added
710 = 100S with 10 phr B Nitride added
711 = 100S with 5 phr TL-5, 5 phr B Nitride, 1 phr CD 509 added
712 = 100S with 5 phr TL-155, 1 phr B Nitride, 1 phr CD 509 added
801 = 100S with 5 phr TL, 5 phr TL-102-2, 1 phr CD 509 added
802 = 100S minus 10 phr MT Carbon plus 5 phr TL-155, 5 phr TL-102-2, 1 phr CD509 added
M = slab molded in the machine direction
T = slab molded in the transverse direction The invention composition is able to provide a significantly smoother surface than those surfaces obtained for press molded conventional compositions. The PTFE micropowder compositions provide molded articles having a uniform dispersion of PTFE on surfaces thereof. In addition, the PTFE micropowder composition improved dispersion of additives within the elastomer matrix. For example, when a filler is mixed with an elastomer and the filler is present as a mixture with the PTFE micropowder composition as the filler and the elastomer are mixed, dispersion of the filler within the elastomer matrix is significantly improved. It is possible that the decomposition or breaking up of components of the PTFE micropowder composition enable the PTFE components to have a greater mobility within the elastomer matrix and thereby pull additives such as reinforcing fillers through the elastomer matrix in a more efficient manner. The granular micropowder component of the PTFE micropowder composition may break apart upon mixing with the elastomer matrix to form particles smaller than the original granular micropowder and the smaller particles derived therefrom have greater mobility through the elastomer matrix.

The PTFE micropowder composition may be one that is rich in fluorine atoms. For example, one or more of the components of the PTFE micropowder composition may be perfluorinated. The perfluorinated component of the PTFE micropowder composition imparts to the PTFE micropowder composition a fluorine content based upon the content of all the atoms in the PTFE micropowder composition that is greater than the fluorine content of the elastomeric polymer of the elastomer matrix. Thus the PTFE micropowder composition, when added to an elastomer matrix, may increase the fluorine content based upon the total amount of fluorine and the total weight of the resulting PTFE micropowder composition/elastomer matrix. The inventive composition therefore provides a means for improving the performance characteristics of lower fluorine content fluoroelastomers.

As is shown above in Table 8, the PTFE micropowder compositions are able to substantially improve the mold sticking resistance of fluoroelastomer compositions undergoing press molding. Likewise, reduced mold fouling is observed when the invention PTFE micropowder composition is present in a fluoroelastomer composition undergoing molding.

Physical properties of fluoroelastomer compositions are also improved when they are processed in the presence of the invention PTFE micropowder composition. Even small amounts of certain PTFE micropowder compositions may lead to an improvement in tear strength. For example mixtures of two PTFE compositions in amounts of 11 pHr or less can improve tear strength (see Table 12 below). As little as 1 phr CD509 with 10 phr TL-5 or TL-102-2 will improve tear strength.

TABLE 12

PTFE micropowder grades showing improved Type T ambient tear strength

| PHR | CD509 | G580 | CDTL-101 | GRTL-155 | CDTL-900 | GRTL-5 | GRTL-156 | CDTL-102-2 | GRTL-10 | B Nitride |
|---|---|---|---|---|---|---|---|---|---|---|
| 1 | I | | | | | | | | | N |
| 3 | I | | | | | | | | | |
| 5 | | | | N | | N | | N | | |
| 10 | I | I | N | N | N | N | N | N | N | N |
| 20 | | N | | | | I1 | | N | | |
| 40 | | | | | | | | N | | |

I = improved ambient tear strength;
I1 = marginal;
N = not improved.

Directional reinforcement is also improved in fluoroelastomer compositions in the presence of the invention PTFE micropowder compositions. As is shown below in Tables 13 and 14 the directional reinforcement in tensile properties is improved in fluoroelastomer compositions that contain an amount of the PTFE micropowder composition.

TABLE 13

PTFE micropowder grades showing directional reinforcement in tensile properties

| PHR | CD509 | G580 | CDTL-101 | GRTL-155 | CDTL-900 | GRTL-5 | GRTL-156 | CDTL-102-2 | GRTL-10 | B Nitride |
|---|---|---|---|---|---|---|---|---|---|---|
| 1 | Y | | | | | | | | | |
| 3 | Y | | | | | | | | | |
| 5 | | | | | Y2 | | Y2 | | | |
| 10 | Y | Y | | | | | | | Y | Y1 |
| 20 | | | | | | Y1 | | | | |
| 40 | | | | | | | | Y1 | | |

Y = improved;
Y1 = marginal;
Y2 = +1 phr 509;
N = no improved directional reinforcement.

TABLE 14

PTFE micropowder grades showing directional reinforcement in tear propagation

| PHR | CD509 | G580 | CDTL-101 | GRTL-155 | CDTL-900 | GRTL-5 | GRTL-156 | CDTL-102-2 | GRTL-10 | B Nitride |
|---|---|---|---|---|---|---|---|---|---|---|
| 1 | Y | | | | | | | | | N |
| 3 | Y | | | | | | | | | |
| 5 | | | | | Y2 | | Y2 | N | | N |
| 10 | | not tested | | not tested | Y1 | not tested | Y | not tested | not tested | |
| 20 | | | Y | | | not tested | | not tested | | |
| 40 | | | | | | | | N | | |

Y = improved;
Y1 = marginal;
Y2 = +1 phr 509;
N = no improved directional reinforcement.

The improvement in time needed to incorporate fillers and/or ingredients was also measured. The presence of mixtures of the PTFE micropowders reduced the amount of time necessary to incorporate fillers and/or ingredients into the composition with reduced processing problems (see Table 15 below).

TABLE 15 reduction of time to incorporate fillers/ingredients

| Product Description | Total Mix Time (mins.) | % Reduction in time to Incorporate | Comments |
|---|---|---|---|
| Standard AFLAS 150P formulation | 18 | NA | Ran well with no sticking |
| AFLAS 150P w/PTFE Additive Pkg "801" | 16 | −11.11 | Ingredients quickly incorporated, reduced flaking |
| Standard AFLAS 100S formulation | 27 | NA | Ran good, had a lot of flaking of ingredients. |
| AFLAS 100S w/PTFE Additive Pkg "801" | 21 | −22.22 | Ran excellent |
| Standard AFLAS 100S formulation | 25 | NA | Ran good |
| AFLAS 100S w/PTFE Additive Pkg "801" | 16 | −36.00 | Ran excellent |
| Standard AFLAS new grade formulation | 25 | NA | Slight sticking to the roll mill |
| Standard AFLAS new grade formulation w/PTFE Additive Pkg "801" | 16 | −36.00 | Ran excellent |

Obviously, numerous modifications and variations of the present invention are possible in light of the above teachings. It is therefore to be understood that within the scope of the appended claims, the invention may be practiced otherwise than as specifically described herein.

The invention claimed is:

1. A molded article obtained by molding a fluoroelastomer composition comprising
 (A) one or more fluoroelastomers, and
 (B) a PTFE micropowder comprising (i) 1 to 10 phr of a granular PTFE micropowder comprising a PTFE having a number average molecular weight of from $10^5$-$10^6$; (ii) 1 to 10 phr of a fine powder PTFE comprising a PTFE having a number average molecular weight of $10^4$-$10^5$; and (iii) 1 to 6 phr of a fine powder PTFE molding resin comprising a PTFE having a number average molecular weight of from $10^6$-$10^7$;
 wherein the number average molecular weight of the fine powder PTFE is different from the number average molecular weight of the granular PTFE micropowder.

2. The molded article of claim 1, wherein the fluoroelastomer composition comprises one or more polymers comprising alternating copolymerized units of tetrafluoroethylene and at least one selected from the group consisting of hexafluoropropylene and propylene.

3. The molded article of claim 1, wherein the fluoroelastomer composition comprises one or more polymers comprising polymerized units of a partially fluorinated monomer unit.

4. The molded article of claim 1, obtained by injection molding the fluoroelastomer composition.

5. The molded article of claim 1, obtained by press molding the fluoroelastomer composition.

6. The molded article of claim 1, wherein the fluoroelastomer composition further comprises carbon black and one or more curatives.

7. The molded article of claim 1, wherein the molded article is selected from the group consisting of an o-ring, a gasket, a seal, a packing, and a coating.

8. An extrusion process, comprising:
 mixing (a) a fluoroelastomer composition with a PTFE micropowder mixture comprising (i) a granular PTFE micropowder having a number average molecular weight of from $10^5$-$10^6$; (ii) a fine powder PTFE micropowder having a number average molecular weight of from $10^4$-$10^5$; and (iii) a fine powder PTFE molding resin having a number average molecular weight of from $10^6$-$10^7$; with
 (b) one or more additives;
 wherein the PTFE micropowder mixture is present as a feed mixture with one or more additives and the feed mixture is added to the fluoroelastomer; and
 wherein the number average molecular weight of the fine powder PTFE is different from the number average molecular weight of the granular PTFE micropowder.

9. The extrusion process of claim 8, wherein the fluoroelastomer composition comprises one or more polymers comprising alternating copolymerized units of tetrafluoroethylene and at least one selected from the group consisting of hexafluoropropylene and propylene.

10. A fluoroelastomer composition comprising (A) one or more fluoroelastomers, and (B) a PTFE micropowder composition;
 wherein the PTFE micropowder composition comprises:
 (i) from 3.5 to 40 wt. % of a granular PTFE micropowder having a number average molecular weight of from $10^5$-$10^6$;
 (ii) from 3.5 to 40 wt. % of a fine powder PTFE having a number average molecular weight of from $10^4$-$10^5$; and
 (iii) from 3.5 to 25 wt. % of a fine powder PTFE molding resin having a number average molecular weight of from $10^6$-$10^7$;
 wherein the number average molecular weight of the fine powder PTFE is different from the number average molecular weight of the granular PIFE micropowder.

11. The fluoroelastomer composition of claim 10, comprising at least one copolymer of tetrafluoroethylene and propylene.

12. The fluoroelastomer composition of claim 10, comprising a fluoroelastomer comprising substantially equal molar amounts of copolymerized perfluoroolefin and propylene.

13. The fluoroelastomer composition of claim 10, wherein the fluoroelastomers (A) are present in an amount of at least 75% by weight based on the total weight of the fluoroelastomers and the PTFE micropowder composition.

14. The fluoroelastomer composition of claim 10, wherein the fluoroelastomers (A) are present in an amount of at least 80% by weight.

15. The fluoroelastomer composition of claim 10, wherein the fluoroelastomers (A) are present in an amount of 100 parts by weight, the granular PTFE is present in an amount of 5 parts by weight, the fine powder PTFE is present in an amount of 5 parts by weight, and the fine powder PTFE molding resin is present in an amount of 1 part by weight.

16. The fluoroelastomer composition of claim 10, wherein the fluoroelastomers (A) are present in an amount of 100 parts by weight, the granular PTFE is present in an amount of from 2-8 parts by weight, the PTFE micropowder is present in an amount of from 1 to 10 parts by weight and the fine powder PTFE molding resin is present in an amount of from 0.5-5 parts by weight.

17. The fluoroelastomer composition of claim 10, further comprising at least one filler selected from the group consisting of carbon black, clay, montmorillonite, barium sulfate, calcium carbonate, magnesium silicate, alumina and fluoropolymers.

18. The fluoroelastomer composition of claim 10, further comprising carbon black in an amount of from 5 to 25 parts by weight.

19. The molded article of claim 1, wherein the fluoroelastomer composition comprises one or more fluoroelastomers (A) in an amount of 100 parts by weight, the granular PTFE in an amount of from 2-8 parts by weight, the PTFE micropowder in an amount of from 1 to 10 parts by weight and the fine powder PTFE molding resin in an amount of from 0.5 to 5 parts by weight.

20. The extrusion process of claim 8, wherein the fluoroelastomer composition comprises one or more fluoroelastomers (A) in an amount of 100 parts by weight, the granular PTFE in an amount of from 2-8 parts by weight, the PTFE micropowder in an amount of from 1 to 10 parts by weight and the fine powder PTFE molding resin in an amount of from 0.5 to 5 parts by weight.

21. The fluoroelastomer composition of claim 10, wherein the granular PTFE micropowder has an average particle size of from 8 to 45 microns; the fine powder PTFE has an average particle size of from 4 to 30 microns; and the fine powder PTFE molding resin has a median particle size of from 300 to 600 µm.

22. The molded article of claim 1, wherein the granular PTFE micropowder has an average particle size of from 8 to 45 microns; the fine powder PTFE has an average particle size of from 4 to 30 microns; and the fine powder PTFE molding resin has a median particle size of from 300 to 600 µm.

23. The extrusion process of claim 8, wherein the granular PTFE micropowder has an average particle size of from 8 to 45 microns; the fine powder PTFE has an average particle size of from 4 to 30 microns; and the fine powder PTFE molding resin has a median particle size of from 300 to 600 µm.

* * * * *